US012624766B2

(12) United States Patent
Usinger et al.

(10) Patent No.: US 12,624,766 B2
(45) Date of Patent: May 12, 2026

(54) VALVE FOR CONTROLLING A FLUID FLOW

(71) Applicant: Festo SE & Co. KG, Esslingen (DE)

(72) Inventors: Eduard Usinger, Aichwald (DE); Eduard Wenske, Kornwestheim (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/672,752

(22) Filed: May 23, 2024

(65) Prior Publication Data

US 2024/0401708 A1     Dec. 5, 2024

(30) Foreign Application Priority Data

May 31, 2023    (DE) ..................... 10 2023 114 217.8

(51) Int. Cl.
*F16K 11/20*          (2006.01)
*F16K 11/07*          (2006.01)

(52) U.S. Cl.
CPC ............ *F16K 11/07* (2013.01); *F16K 11/207* (2013.01); *F16K 2200/301* (2021.08); *F16K 2200/3053* (2021.08)

(58) Field of Classification Search
CPC .. F16K 11/07; F16K 11/207; F16K 2200/305; F16K 2200/301; F16K 3/24; F16K 3/314
See application file for complete search history.

(56) References Cited

U.S. PATENT DOCUMENTS

| | | | | |
|---|---|---|---|---|
| 4,924,902 | A | * | 5/1990 | Lewis ................. F15B 13/0402 |
| | | | | 137/271 |
| 6,273,396 | B1 | * | 8/2001 | Kato ................... F16K 31/0655 |
| | | | | 267/180 |
| 10,174,771 | B2 | | 1/2019 | Miyazoe et al. |
| 2017/0292541 | A1 | * | 10/2017 | Miyazoe ................ F16K 11/07 |

FOREIGN PATENT DOCUMENTS

| | | |
|---|---|---|
| JP | 9-014316 | 1/1997 |
| JP | 2003-120834 | 4/2003 |
| JP | 2013-122273 | 6/2013 |

OTHER PUBLICATIONS

JP2013122273A translation (Year: 2025).*
Office Action issued in corresponding German Patent Application No. 10 2023 114 217.8, Feb. 5, 2024, 7 pages.
Search Report issued in corresponding European patent application No. 24172939.1, Oct. 21, 2024, 9 pages.

* cited by examiner

*Primary Examiner* — Kelsey E Cary
(74) *Attorney, Agent, or Firm* — HSML P.C.

(57)          ABSTRACT

A valve for controlling fluid flows, including a valve housing in which a control bore extends along a bore axis, in which a first valve member is moveably accommodated along the bore axis between a first open position and a first closed position for a first fluid channel and in which a second valve member is moveably accommodated along the bore axis between a second open position and a second closed position for a second fluid channel and further including a first drive assigned to the first valve member and a second drive (Continued)

assigned to the second valve member, in which a helical compression spring extends along the bore axis from the first valve member to the second valve member and has a central spring section with a central coil pitch which is at least virtually identical to a wire diameter of the compression spring.

10 Claims, 2 Drawing Sheets

VALVE FOR CONTROLLING A FLUID FLOW

This application claims priority to German Patent Application No. 10 2023 114 217.8 filed May 31, 2023, which is incorporated by reference.

SUMMARY OF THE INVENTION

The invention relates to a valve for controlling a fluid flow, with a valve housing in which a control bore is formed which extends along a bore axis and in which a first valve member movable along the bore axis between a first open position and a first closed position for a first fluid channel and a second valve member movable along the bore axis between a second open position and a second closed position for a second fluid channel are accommodated, with a first drive, which is assigned to the first valve member for providing a first actuating force along a first force direction, and with a second drive, which is assigned to the second valve member for providing a second actuating force along a second force direction, and with a compression spring, which extends along the bore axis from the first valve member to the second valve member and is designed as a helical spring.

With a valve of this type, fluid flows in the first and second fluid channel, each of them extending through the valve housing can be influenced individually and independently of each other with the aid of the associated first and second drives. Since the first valve member and the second valve member are accommodated in the same common control bore and a common use of the compression spring formed as a helical spring is provided, a cost-effective and compact design of the valve can be achieved.

The task of the invention is to provide a valve for controlling fluid flows which valve has improved operational reliability.

This task is solved for a valve of the type mentioned at the beginning in that the compression spring has a central spring section which is arranged between the first valve member and the second valve member and which has a central coil pitch which is at least virtually identical, in particular identical, to a wire diameter of the compression spring, in particular to a wire diameter of the compression spring in the central spring section.

The compression spring, which is arranged between the first valve member and the second valve member and is designed as a helical spring, serves to provide compressive forces on the first valve member and the second valve member. When the first valve member moves relative to the valve housing and the second valve member and also when the second valve member moves relative to the valve housing and the first valve member, compression or expansion of the helical spring takes place depending on the respective direction of movement of the respective valve member. This relative movement manifests itself in an increase or decrease in the deformation energy stored in the helical spring.

The helical spring is formed by a plurality of, preferably circular, coils of a spring wire, whereby a longest extension of the helical spring is aligned along the bore axis of the control bore when the helical spring is used in the valve. A distance between adjacent coils of the helical spring is also referred to as a pitch, whereby the pitch together with a coil diameter of the, preferably circular, coil and a wire diameter of the spring wire, which spring wire is preferably formed with a circular cross-section, determine the deformation properties of the helical spring.

The compression spring intended for use in the valve has a central spring section that extends between a first spring section and a second spring section. The central spring section serves to connect the first spring section to the second spring section. The first spring section and the second spring section are designed in such a way that a relative movement of the first valve member and/or the second valve member along the bore axis leads to compression or expansion, i.e. to a shortening or lengthening of the first spring section and the second spring section. The task of the central spring section when used in the valve is to ensure stable force transmission between the first spring section and the second spring section.

In a valve known from the prior art, the first spring section and the second spring section are each formed by separate helical springs and the two helical springs are connected by a rigid connecting element such as a round rod or a tube section. The disadvantage here is that at least three components are required with the first spring section, the connecting element and the second spring section, which results in higher manufacturing costs and an increased installation space requirement compared to the one-piece compression spring according to the invention with its differently configured spring sections.

In order to ensure advantageous force transmission between the first spring section and the second spring section, the central spring section has a central coil pitch in which a distance between adjacent coils corresponds at least almost to the wire diameter provided for the central spring section. Preferably, the coil pitch for the central spring section corresponds to the wire diameter provided for the central spring section, so that neighboring coils in the central spring section are in direct contact with each other. When the coils are arranged in this way, it is also said that the coils are block-wound. On the one hand, this ensures direct transmission of compressive forces between the first spring section and the second spring section, as the central spring section cannot undergo any further compression due to the contact between the associated coils. On the other hand, such an arrangement of the coils prevents buckling of the central spring section, which could occur if the compressive forces between the first spring section and the second spring section in the central spring section are greatly increased and if the coils in the central spring section are not arranged directly adjacent to each other, in particular if they are not in direct contact with each other. Such buckling of the compression spring would result in the compression spring no longer extending along the bore axis, but rather being bulged out in a U-shape in the central spring section, thus jeopardizing the entire function of the valve.

Advantageous further embodiments of the invention are the subject of the subclaims.

It is expedient for the compression spring to have a first spring section associated with the first valve member, which is formed with a first coil pitch at least in some areas, and for the compression spring to have a second spring section associated with the second valve member, which is formed with a second coil pitch at least in some areas, the first coil pitch and the second coil pitch being larger than the central coil pitch. The task of the first spring section and the second spring section is to provide restoring forces for the first valve member and the second valve member, which can be subjected individually with first actuating forces and with second actuating forces by the respectively assigned first and second drives. It can be assumed here that both the first drive and the second drive are each designed to be single-acting. This means that each of the two drives are designed exclusively to provide an actuating force along exactly one direction of force and the respective valve member is reset by the associated spring section. For this purpose, the first spring section has a first coil pitch that is larger than the central coil pitch. This applies at least in the event that the first valve element has not been transferred from a neutral position to a functional position by the first actuating force provided by the first drive. Depending on the design of the control bore and the first valve member, it may be provided that the neutral position for the first valve member means a closed position for the first fluid channel and the functional position for the first valve member means an open position for the first fluid channel. Alternatively, it may be provided that the neutral position for the first valve member means an open position for the first fluid channel and the functional position for the first valve member means a closed position for the first fluid channel. The design for the control bore and the second valve member can be provided in the same way. It is particularly preferred that the first coil pitch or winding pitch and the second coil pitch or winding pitch in the respective neutral position of the first valve member and second valve member are greater than the first coil pitch and the second coil pitch in the respective functional position of the first valve member and the second valve member, wherein both the first coil pitch and the second coil pitch are always greater than the central coil pitch in order to avoid a blockage of movement for the first valve member and the second valve member.

It is preferably provided that the first valve member, starting from a first end face facing the second valve member, is provided with a first blind hole extending along the bore axis, which first blind hole is designed to receive at least a part of the first spring section, and that the second valve member, starting from a second end face facing the first valve member, is provided with a second blind hole extending along the bore axis, which second blind hole is designed to receive at least a part of the second spring section. By designing the first valve member and the second valve member in this way, a large extension of the compression spring along the bonus axis achieved while maintaining a compact design for the valve, thus enabling an advantageous adaptation of the compression spring to the requirements of the first valve member with the associated first drive and of the second valve member with the associated second drive. As an example, it is provided that the compression spring is accommodated in the first blind hole and the second blind hole for more than 50 percent, preferably more than 75 percent, in particular more than 85 percent, of its extension along the bore axis, provided that the first valve member and the second valve member are in the respective neutral position. If both valve members are transferred to the respective functional position, the proportion of the length with which the compression spring is accommodated in the respective blind holes increases even further.

In one embodiment of the invention, it is provided that the central spring section extends into the first blind hole (in which the first spring section is completely accommodated) and into the second blind hole (in which the second spring section is completely accommodated). This ensures that in a region between the first valve member and the second valve member, in which no guidance of the compression spring by the first valve member and the second valve member is ensured, only the central spring section with its high resistance to undesired buckling is arranged.

It is advantageous if the second direction of force is opposite to the first direction of force and points in the direction of the first valve member. Accordingly, a distance between the first valve member and the second valve member has a maximum amount in the respective neutral position. The distance is reduced when one of the two valve members is transferred to the respective functional position and this distance has a minimum amount after both valve members have been transferred to their respective functional position. In this way, the compression spring develops its maximum restoring force when both the first valve member and the second valve member are positioned in the respective functional position.

In an advantageous further development of the invention, it is provided that an extension of the compression spring along the bore axis is at least 10 times, preferably at least 15 times, an outer diameter of the compression spring.

It is useful if, in an installed state, the compression spring has an internal preload which is dependent on a distance between the first valve member and the second valve member. Furthermore, the central spring section of the compression spring is block-wound at least in some areas even in an uninstalled state. The internal preload in the installed state of the compression spring ensures that the first valve member and the second valve member are reliably held in the respective neutral position, provided that no actuating force acts on the respective valve member. If such an actuating force is greater than the preload of the compression spring, a relative movement of the first valve member or the second valve member with respect to the valve housing is enabled. The design of the central spring section as an arrangement of several block-wound coils wound, which is also present when the compression spring is removed, ensures advantageous stability for the central spring section in every actuation situation for the compression spring.

It is preferable that an end area of the first spring section facing away from the second valve member has a coil pitch that decreases with increasing distance from the second valve member. In the same way, a coil pitch that decreases with increasing distance from the first valve member is provided for an end region of the second spring section facing away from the first valve member. This ensures an advantageous transmission of force from the first or second valve member to the respective end regions of the first spring section or the second spring section.

In a further embodiment of the invention, it is provided that the first fluid channel extends through the valve housing between a first inlet connection mounted on the valve housing and a first outlet connection mounted on the valve housing. Furthermore the first fluid channel comprises a first bore section of the control bore, which is designed as a valve seat or as a slide bore, the first valve member being designed as a seat valve member or as a slide valve member for optionally blocking or releasing a flow cross-section in the first bore section. Accordingly, the first control valve determined by the first bore portion of the control bore and the first valve member is formed as either a poppet valve (seat valve) or as a spool valve. Similarly, the second control valve determined by a second bore portion of the control bore and the second valve member may be formed as either a poppet valve or a spool valve. Preferably, the first control valve and the second control valve are each designed identically and arranged mirror-symmetrically to a center plane of the valve.

It is advantageous if the first drive is a pneumatic drive, in which the first valve member with the control bore defines a variable-size first drive chamber, or that the first drive is a solenoid drive, in which the first valve member is movably received as an armature in a solenoid coil. If the first drive is a pneumatic drive, at least one region of the first valve member serves as a pneumatic piston, which delimits a variable-size working space with a region of the control bore and can be displaced against the restoring force of the compression spring as a function of a working pressure in this working space. If the first drive is a solenoid drive, it can be provided that the first valve element is arranged as a movable armature in a central recess of a solenoid coil and can be displaced against the restoring force of the compression spring when current is applied to the solenoid coil. In the same way, the second drive can be designed either as a pneumatic drive or as a solenoid drive. Preferably, the first drive and the second drive are designed in the same way and can provide opposing first and second actuating forces.

BRIEF DESCRIPTION OF THE DRAWINGS

Advantageous embodiments of the invention are shown in the drawing. Here shows.

DETAILED DESCRIPTION OF THE INVENTION

Figure 1:
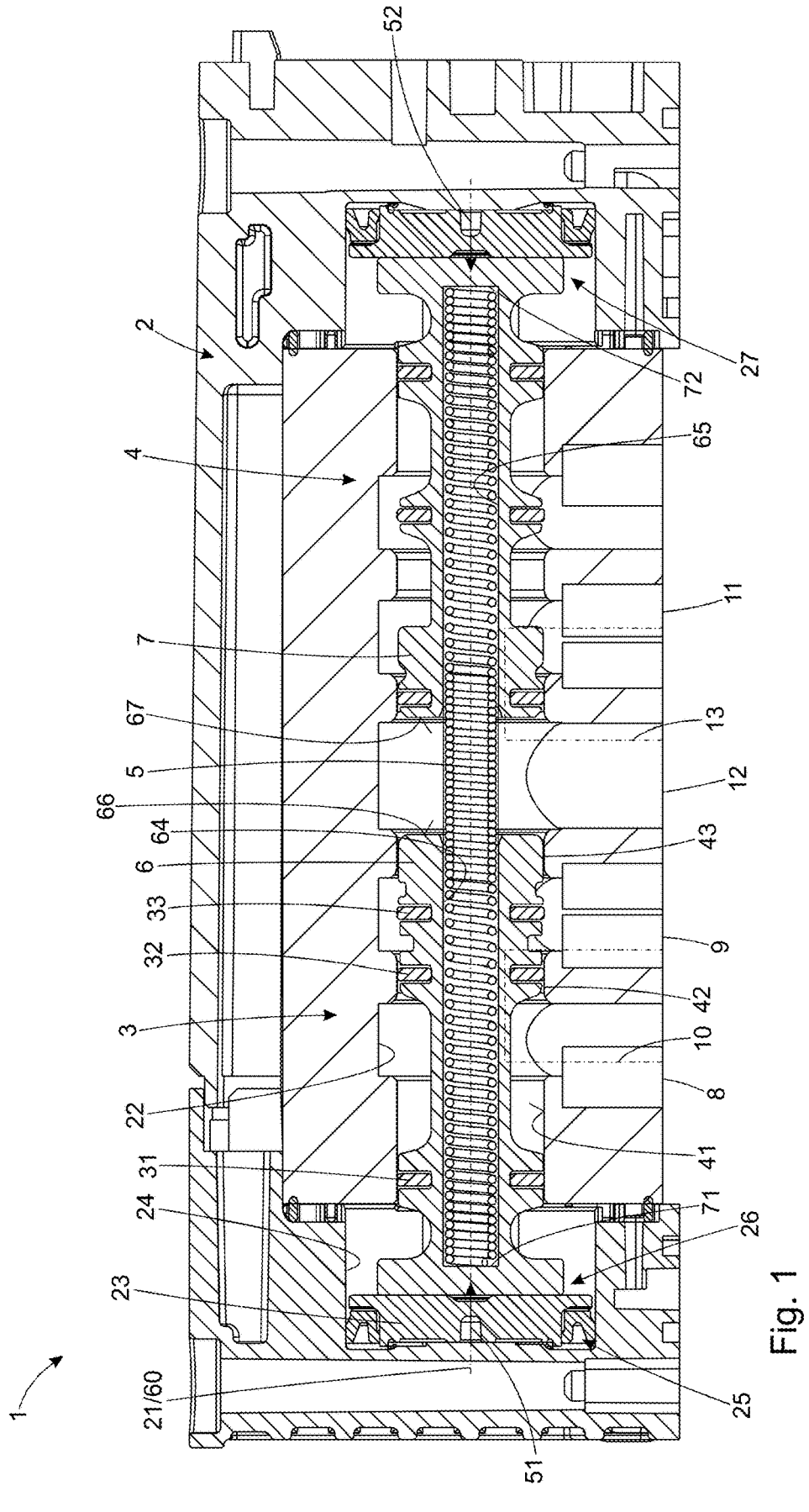
FIG. 1 a schematic sectional view of a first embodiment of a valve for controlling fluid flows, in which a first valve member and a second valve member together with the control bore form a slide valve arrangement and are pneumatically pilot-controlled, a compression spring being provided for resetting the two valve members.

A first embodiment of a valve 1 shown schematically in FIG. 1 comprises a valve housing 2 which accommodates a first control valve 3 and a second control valve 4. By way of example only, both the first control valve 3 and the second control valve 4 are each designed as pneumatically pilot-controlled 3/2-way spool valves that can be operated independently of each other and that jointly use a compression spring 5 serving as a return spring. As shown in FIG. 1, a first valve member (or valve element) 6 of the first control valve 3 and a second valve member (or valve element) 7 of the second control valve 4 are in a neutral position. By way of example only, the neutral positions for the first valve member 6 and the second valve member 7 are selected such that the first valve member 6 blocks a first fluid channel 10 extending between a first inlet port 8 and a first outlet port 9 and that the second valve member 7 blocks a second fluid channel 13 extending between a second inlet port 11 and a second outlet port 12.

The following description of the design and function of the first control valve 3, which is designed as a, in particular normally open (NO), 3/2-way valve, also essentially applies to the second control valve 4, which is designed as a, in particular normally closed (NC), 3/2-way valve, especially since the function of the compression spring 5, which is essential to the invention, is independent of the respective design of the control valve 3, 4, so that a description of the design and function of the second control valve 4 is dispensed with.

The mode of operation of the first control valve 3, which is designed as a pneumatically pilot-controlled 3/2-way spool valve, is based on the fact that the first valve member 6 is received linearly movable along a bore axis 21 in a control bore 22 of the valve housing and is provided at the end with a piston 23, which defines a variable-size working space 25 with a bore section of the control bore 22 designed as a piston bore 24 and thus forms a first drive 26. In the same way, a second drive 27 is formed by the components of the second control valve 4.

The working chamber 25 can be ventilated and vented via a working bore that is not visible in FIG. 1. When the working chamber 25 is ventilated, i.e. when compressed air is supplied into the working chamber 25, an increasing pressure force is exerted on the piston 23 as an actuating force with a first force direction 51 aligned in the direction of the second valve member 7, which counteracts a return force of the compression spring 5. It is provided here that the restoring force of the compression spring 5 in the neutral position of the first valve member 6 is dimensioned in such a way that a movement of the first valve member 6 in the direction of the second valve member 7 only takes place when a preset pressure level is reached in the working chamber 25. The pressure force on the working piston 25 leads to an elastic compression, i.e. a shortening, of the compression spring 5, and thus to a movement of the first valve member 6 in the direction of the second valve member 7. Due to the reduction in the length of the compression spring 5 and the associated elastic deformation of the compression spring 5, the restoring force provided by the compression spring 5 increases.

During the movement of the first valve member 6 in the direction of the second valve member 7, a sliding movement of a first radial seal 31 takes place on a first inner surface 41 of the control bore 22, which is purely exemplary circularly cylindrical shaped, wherein the first inner surface 41 extends along the bore axis 21 in such a way that a sealing effect is always provided between the first radial seal 31 and the first inner surface 41, irrespective of the position of the first valve member 6.

When venting an undesignated working chamber formed by the second valve member 7 with the control bore 22, an actuating force with a second force direction 52 aligned in the direction of the first valve member 6 acts on the second valve member 7.

A second radial seal 32 arranged at a distance from the first radial seal 31 is in sealing contact with a second inner surface 42 of the control bore 22 in the neutral position of the first valve member, whereby a fluidically communicating connection for the first fluid channel 10, which extends between the first inlet port 8 and the first outlet port 9 and partially in the region of the second inner surface 42 through the control bore 22, is blocked and thus interrupted. When the first valve member 6 approaches the functional position (not shown), the sealing effect between the second radial seal 32 and the second inner surface 42 is canceled, thereby releasing the fluidic communicating connection between the first inlet port 8 and the first outlet port 9. As a result, fluid can flow from the first inlet port 8 to the first outlet port 9 in a purely exemplary manner and also pass through the control bore 22 in the area of the second inner surface 42. In order to avoid undesired spillage of the fluid flowing through the first fluid channel 10 in the direction of the second valve member 7, a sealing effect is created between a third radial seal 33 and a third inner surface 43 of the control bore during the displacement of the first valve member 6 from the neutral position to the functional position.

If, starting from the functional position for the first valve member 6 (not shown in FIG. 1), the working chamber 25 is vented, the pressure force acting on the piston 23 decreases and, due to the spring energy stored in the compression spring, the first valve member 6 is returned to the neutral position as shown in FIG. 1.

In the neutral position of the two valve members 6 and 7, the compression spring 5 is accommodated between the two valve members 6 and 7 with a low preload, which is dimensioned in such a way that, when the valve 1 is used as intended, undesired movement of the two valve members 6 and 7 is prevented without pressurization of the respectively assigned working chamber 25, even if, for example, vibrations are introduced from outside onto the valve 1.

The compression spring 5 is arranged between the first valve member 6 and the second valve member 7 in such a way that a winding axis 60 of the compression spring 5 is aligned parallel to the bore axis 21 of the control bore 22. The compression spring 5 has a first spring section 61, a second spring section 62 and a central spring section 63. It can be seen from FIG. 1 that the first spring section 61 is completely accommodated in a first blind hole 64, which is formed as a circular cylindrical bore in the first valve member 6 starting from a first end face 66 facing the second valve member 7 along the bore axis 21. In the same way, the second spring section 62 is completely accommodated in a second blind hole 65, which is formed as a circular cylindrical bore in the second valve member 7 along the bore axis 21, starting from a second end face 67 facing the first valve member 6.

The first spring section 61 rests with a first end region 68 facing away from the second valve member 7 against a first base surface 71 of the first blind hole 64, which is of purely exemplary circular design. The second spring section 62 rests with a second end region 69 facing away from the first valve member 6 against a second base surface 72 of the second blind hole 65, which is purely exemplarily circular.

By way of example only, the compression spring 5 has a uniform coil diameter 73 and a uniform wire diameter 74 over its entire extension. Furthermore, the compression spring 5 has a circular wire cross-section over its entire extension. In embodiments of compression springs not shown, it may be provided that the coil diameter and/or the wire diameter and/or the wire cross-section varies over the extension of the compression spring.

The first spring section 61 has a first coil pitch 81 away from the first end region 68, which by way of example corresponds to no more than 2 times the wire diameter 74. As a result, when the compression spring 5 is compressed, elastic deformation of the coils 75 of the first spring section 61 can cause a change in length of the compression spring 5 in the form of a shortening of the compression spring 5.

The first end region 68 is designed with a coil pitch 84 which corresponds to the wire diameter 74, so that the first end region 68 does not undergo any change in length when the compression spring 5 is compressed, since the adjacent coils are already arranged in direct contact with one another in the neutral position of the two valve members 6 and 7.

The central spring section 63 arranged between the first spring section 61 and the second spring section 62 has a central coil pitch 83, which corresponds to the wire diameter 74, so that the central spring section 63 does not undergo any change in length when the compression spring 5 is compressed, since the adjacent coils are already arranged in direct contact with one another in the neutral position of the two valve members 6 and 7. This ensures that the coils 77 of the central spring section 63, which in contrast to the coils

75 of the first spring section 61 and the coils 76 of the second spring section 62 are not guided through the respective valve member 6, 7, do not buckle in a direction transverse to the coil axis 60, which would lead to a malfunction of the valve 1.

Purely by way of example, a continuous transition between the coil pitch 83 of the first end section and the first coil pitch 81 is provided in a first transition section 86. A continuous transition between the first coil pitch 81 and the central coil pitch 83 is also provided in a second transition region 87 between the first spring section 61 and the central spring section 63, wherein an extension of the first transition region 86 along the coil axis 60 is, purely by way of example, greater than an extension of the second transition region 87 along the coil axis 60.

Figures 2, 3:
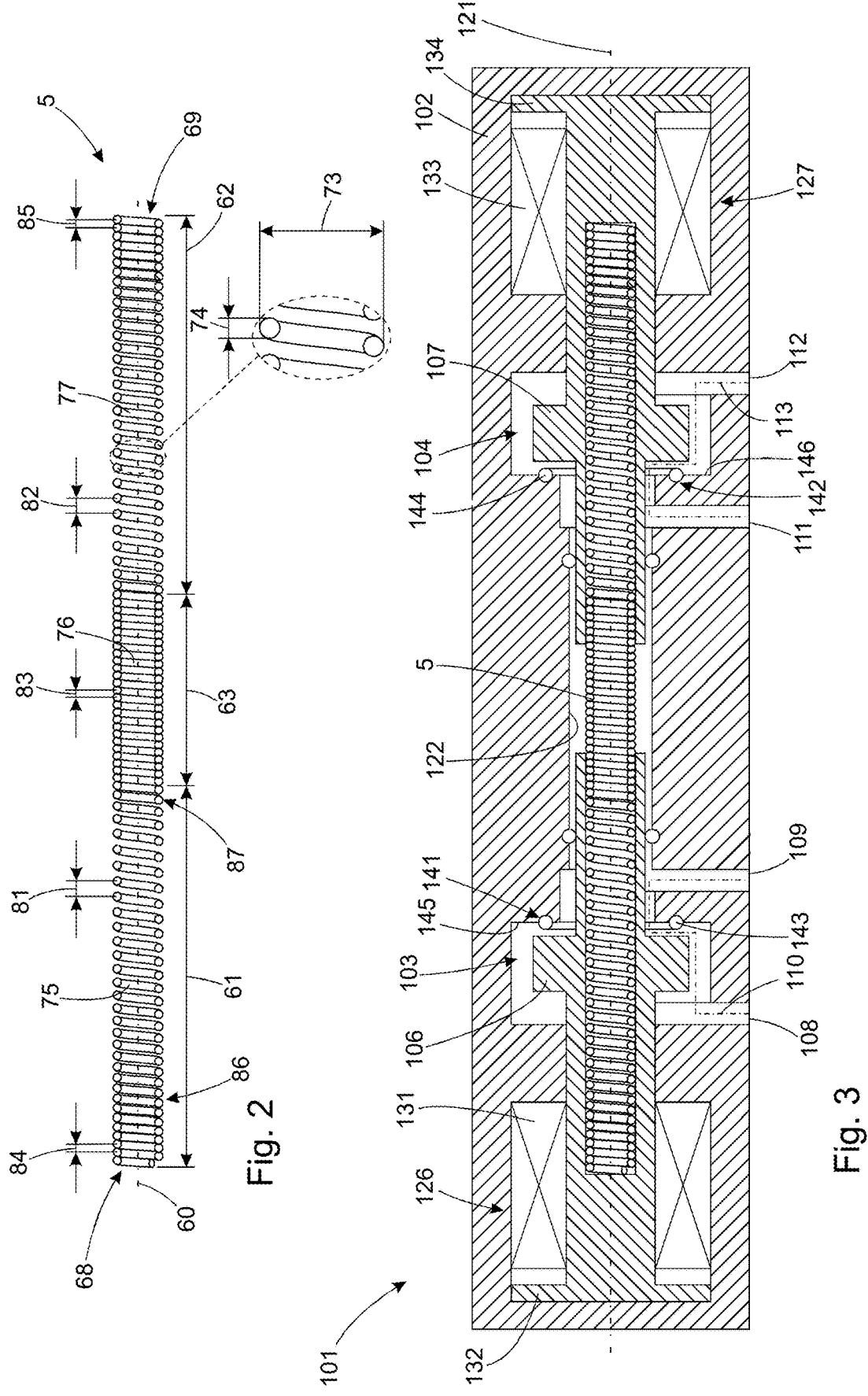
FIG. 2 is a schematic sectional view of the compression spring as shown in FIG. 1 in a dismantled state, and FIG. 3 a schematic sectional view of a second embodiment of a valve for controlling fluid flows, in which a first valve member and a second valve member together with the control bore form a seat valve arrangement and are driven magnetically, a compression spring being provided for resetting the two valve members.

In the second embodiment of a valve 101 shown in FIG. 3, the same compression spring 5 is used as in the first embodiment of the valve 1 shown in FIG. 1. The valve 101 differs from the valve 1 in that the first valve member 106 of the first control valve 103 passes through a first solenoid coil 131 and is provided at the end with a first armature plate 132, which is of purely exemplary circular cylindrical design. Furthermore, the second valve member 107 of the second control valve 104 passes through a second solenoid coil 133 and is provided at the end with a second armature plate 132 of purely exemplary circular cylindrical design.

In the control bore 122, as a component of the first control valve 103, a first valve seat 141 is formed concentrically to the bore axis 121 and is designed as an annular end face and equipped with a first sealing ring 143, which is designed for a flat and thus sealing contact of a first sealing surface 145 of the first valve member 106 when the latter is transferred from the neutral position shown into a functional position (not shown). In the functional position, the fluidically communicating connection for the first fluid channel, which extends between the first inlet port 108 and the first outlet port 109, is blocked.

The compression spring 5 is adapted to the assembly of the first solenoid coil 131 and the first valve member 106 with the associated armature plate 132, which serves as the first drive 126, in such a way that when a coil current is provided to the first solenoid coil 131, which must exceed a predetermined current intensity amount, an axial attractive force is exerted by the first solenoid coil 131 on the first armature plate 132, so that a compression of the compression spring 5 and a displacement of the first valve member 106 from the neutral position shown into a functional position (not shown) can be caused. As a result, the first sealing surface 145 of the first valve member 106 comes into sealing contact with the first valve seat 141 and blocks the first fluid channel 110.

The second control valve 104 is designed in the same way, so that a description of the components and the function for the second control valve 104 is dispensed with.

The invention claimed is:

1. A valve for controlling a fluid flow, comprising:
   a valve housing in which a control bore extends along a bore axis,
   wherein a first valve member is accommodated movable along the bore axis in the control bore between a first open position and a first closed position for a first fluid channel,
   wherein a second valve member is accommodated movable along the bore axis in the control bore between a second open position and a second closed position for a second fluid channel, further comprising a first drive, which is assigned to the first valve member for providing a first actuating force along a first force direction, and further comprising a second drive, which is assigned to the second valve member for providing a second actuating force along a second force direction, wherein a helical compression spring extends along the bore axis from the first valve member to the second valve member, wherein the compression spring has a central spring section which is arranged between the first valve member and the second valve member and the second valve member and which has a central coil pitch which is at least identical to a wire diameter of the compression spring.

2. The valve according to claim 1, wherein the compression spring has a first spring section with a first coil pitch, which first spring section is assigned to the first valve member, and wherein the compression spring has a second spring section with a second coil pitch, which second spring section is assigned to the second valve member, wherein the first coil pitch and the second coil pitch are larger than the central coil pitch.

3. The valve according to claim 2, wherein the first valve member is provided with a first blind hole starting from a first end face facing the second valve member and extending along the bore axis, wherein the first spring section is received in the first blind hole, and wherein the second valve member is provided with a second blind hole starting from a second end face facing the first valve member and extending along the bore axis, wherein the second spring section is received in the second blind hole.

4. The valve according to claim 1, wherein the second force direction is oriented opposite to the first force direction and points in the direction of the first valve member.

5. The valve according to claim 1, wherein an extension of the compression spring along the bore axis is at least 10 times larger than an outer diameter of the compression spring.

6. The valve according to claim 1, wherein the compression spring has an internal prestress which is dependent on a distance between the first valve member and the second valve member in an installed state and wherein the central spring section of the compression spring is block-wound.

7. The valve according to claim 6, wherein the first drive is a pneumatic drive, wherein the first valve member delimits a variable-size first drive chamber with the control bore, or wherein the first drive is a solenoid drive, wherein the first valve member is accommodated movably as an armature in a solenoid coil.

8. The valve according to claim 1, wherein an end region of the first spring section facing away from the second valve member has a coil pitch which decreases with increasing distance from the second valve member.

9. The valve according to claim 1, wherein the first fluid channel extends between a first inlet connection on the valve housing and a first outlet connection on the valve housing and comprises a first bore section with a valve seat or a spool bore, wherein the first valve member is a seat valve member or a spool valve member for selectively blocking or releasing a flow cross-section in the first bore section.

10. A valve for controlling a fluid flow, comprising:

a valve housing in which a control bore extends along a bore axis, wherein a first valve member is accommodated movable along the bore axis in the control bore between a first open position and a first closed position for a first fluid channel, wherein a second valve member is accommodated movable along the bore axis in the control bore between a second open position and a second closed position for a second fluid channel, further comprising a first drive, which is assigned to the first valve member for providing a first actuating force along a first force direction, and further comprising a second drive, which is assigned to the second valve member for providing a second actuating force along a second force direction, wherein a helical compression spring extends along the bore axis from the first valve member to the second valve member, wherein the compression spring has a central spring section which is arranged between the first valve member and the second valve member and the second valve member and which has a central coil pitch which is at least identical to a wire diameter of the compression spring, wherein the compression spring has a first spring section with a first coil pitch, which first spring section is assigned to the first valve member, and wherein the compression spring has a second spring section with a second coil pitch, which second spring section is assigned to the second valve member, wherein the first coil pitch and the second coil pitch are larger than the central coil pitch, wherein the first valve member is provided with a first blind hole starting from a first end face facing the second valve member and extending along the bore axis, wherein the first spring section is received in the first blind hole, and wherein the second valve member is provided with a second blind hole starting from a second end face facing the first valve member and extending along the bore axis, wherein the second spring section is received in the second blind hole, wherein the central spring section extends into the first blind hole and extends into the second blind hole.

* * * * *